(12) United States Patent
Devaux et al.

(10) Patent No.: US 10,817,288 B2
(45) Date of Patent: Oct. 27, 2020

(54) COMBINED INSTRUCTION FOR ADDITION AND CHECKING OF TERMINALS

(71) Applicant: UPMEM, Grenoble (FR)

(72) Inventors: Fabrice Devaux, Grenoble (FR); David Furodet, Grenoble (FR)

(73) Assignee: UPMEM, Grenoble (FR)

( * ) Notice: Subject to any disclaimer, the term of this patent is extended or adjusted under 35 U.S.C. 154(b) by 147 days.

(21) Appl. No.: 16/076,869

(22) PCT Filed: Jan. 19, 2017

(86) PCT No.: PCT/FR2017/050107
§ 371 (c)(1),
(2) Date: Aug. 9, 2018

(87) PCT Pub. No.: WO2017/137675
PCT Pub. Date: Aug. 17, 2017

(65) Prior Publication Data
US 2019/0050223 A1  Feb. 14, 2019

(30) Foreign Application Priority Data

Feb. 10, 2016 (FR) .................. 16 51063

(51) Int. Cl.
*G06F 9/30* (2018.01)
*G06F 11/07* (2006.01)

(52) U.S. Cl.
CPC .......... *G06F 9/3001* (2013.01); *G06F 11/073* (2013.01)

(58) Field of Classification Search
None
See application file for complete search history.

(56) References Cited

U.S. PATENT DOCUMENTS

| | | | |
|---|---|---|---|
| 6,185,673 B1 * | 2/2001 | Dewan | G06F 9/30101 712/223 |
| 6,542,990 B1 | 4/2003 | Tremblay et al. | |
| 7,231,666 B2 * | 6/2007 | Haugh | G06F 21/52 726/22 |
| 8,769,167 B2 | 7/2014 | Nishino | |

FOREIGN PATENT DOCUMENTS

EP     2096551 A1    9/2009

OTHER PUBLICATIONS

International Search Report for PCT/FR2017/050107 dated Mar. 14, 2017.
Intel: "Intel 64 and IA-32 Architectures Software Developer's Manual snippets", Sep. 1, 2006 (Sep. 1, 2006), XP055292424, Retrieved from the Internet: URL:http://www.intel.com/.
Kanter, D.: "Intel's Haswell CPU Microarchitecture", Nov. 13, 2012 (Nov. 13, 2012), XP055354045, Retrieved from Internet: URL:http://www.realworldtech.com/haswell-cpu/4/.

* cited by examiner

*Primary Examiner* — Michael D. Yaary
(74) *Attorney, Agent, or Firm* — Bachman & LaPointe, P.C.

(57) ABSTRACT

A processor core comprising in its set of instructions, a combined addition and bound-checking instruction (ADDCK) defining an integer n implicitly, or explicitly as a parameter of the instruction; an adder having a width p strictly greater than n bits; and a processing circuit (MUX, 42) designed to respond to the combined instruction by activating an overflow signal (BX) when the adder generates a carry of rank n during the addition of operands of width p.

7 Claims, 2 Drawing Sheets

ADDCK S, A, B, n

COMBINED INSTRUCTION FOR ADDITION AND CHECKING OF TERMINALS

FIELD

The invention relates to transfers of data between two entities, in particular in a general case where the consumption of data by one of the entities does not have the same granularity as the production of data by the other entity.

BACKGROUND

FIG. 1 illustrates an example of a situation of data transfer according to different granularities between a producing entity 10 and a consuming entity 12. A producing entity 10 may comprise a memory system SMEM, for example of the dynamic type, storing a succession of data units U to be processed by the consuming entity 12. The consuming entity may comprise a processor core CPU designed to read the data units to be processed in a local working memory WMEM.

A data unit U generally comprises a plurality of bytes. A data unit is for example a "structure" defined according to the language used for programming the processor. Such a structure is definable arbitrarily by the programmer in order to contain variables of different types and lengths.

The fact that the data units can be produced with a granularity different from that used for their consumption poses difficulties in achieving effective coordination between production and consumption.

SUMMARY

In general terms, a processor core is provided comprising, in its set of instructions, a combined instruction of addition and checking of bounds defining an integer n associated implicitly, or explicitly as a parameter of the instruction; an adder having a width strictly greater than n bits; and a processing circuit designed to respond to the combined instruction by the activation of an overflow signal when the adder generates a carry of rank n.

The processing signal may further be designed to trigger an execution error when the overflow signal is activated, and the result of this is that the procedure triggered for processing the error may be an overflow management procedure.

According to an alternative, the processing circuit may further be designed to cause a systematic jump, thus making it possible to make a systematic forward jump of one or more instructions when the overflow signal is inactive, and a normal continuation when the overflow signal is activated, and the result of this is that the instruction or instructions immediately following the combined instruction may be designed to manage the overflow.

According to another alternative, the processing circuit may further be designed to cause a call on a subprogram when the overflow signal is activated, and a normal continuation when the overflow signal is inactive, and the result of this is that the subprogram may be designed to manage the overflow.

The processor core may further comprise, in its set of instructions, reading instructions with address pre- and post-incrementation, including for the address incrementation an addition combined with a checking of bounds.

A data transfer method is also provided, using a combined instruction of addition and checking of bounds, comprising the following steps implemented by the processor: allowing a memory page, the size of which is a power of 2 and the address of which is a multiple of the size, in a working memory of the processor, to contain a series of data units in respective consecutive locations; identifying the start of a current location of a data unit by a pointer contained in a working register of the processor; using the current location; executing a combined instruction of addition and checking of bounds for incrementing the pointer, the bound of the combined instruction being based on the size of the page; and executing an overflow management procedure in response to the activation of the overflow signal.

The overflow management procedure may be programmed to allow a new page in the working memory and to update the pointer in order to identify a starting location in the new page.

The step of using the current location in the memory page may comprise a reading of the data unit contained in the current location in order to transfer it into registers of the processor, the method further comprising the steps consisting of transferring, into the memory page, data units supplied by a producing entity, the data units having an arbitrary size that may mean that the page does not contain an integer number of data units, and the result of this is that the activation of the overflow signal may occur when data have been read beyond the page; reserving a memory area following the page, with a size sufficient to contain a complete data unit; and transferring an integer number of data units sufficient to fill the page and to overflow into the reserve memory area, and the result of this is that the data read beyond the page corresponds to actual data of a data unit.

BRIEF DESCRIPTION OF THE DRAWINGS

Embodiments will be disclosed in the following description, given non-limitatively in relation to the accompanying figures, among which.

DETAILED DESCRIPTION

Figure 1:
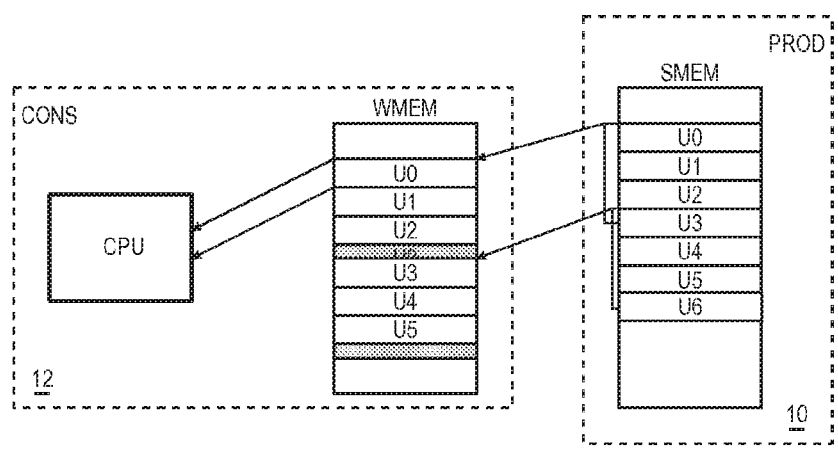
FIG. 1, described previously, illustrates an example of a data transfer situation according to different granularities between a producing entity and a consuming entity.

In a situation as illustrated in FIG. 1, the processor core CPU may be designed to read the data units U byte by byte in the memory WMEM without loss of efficacy, whereas it could not be envisaged reading the data units byte by byte in the system memory SMEM. To make accesses to the system memory, often of the dynamic type, profitable, the transfers are generally made in bursts of $2^n$ contiguous bytes, for example 256, 512 or 1024 bytes.

In the example in FIG. 1 it is assumed that a transfer burst contains a little more than three data units U. Thus a first burst makes it possible to transfer into the memory WMEM the units U0 to U2 and the start of the unit U3.

The processor CPU reads the data units in the memory WMEM byte by byte for example. In reaching the unit U3, which is incomplete, it is desirable for the processor to detect an overflow condition and to initiate a new transfer burst, containing the complete unit U3 and the following units (U4, U5, and the start of the unit U6).

The new burst is placed in the memory WMEM in continuity with the previous burst, as shown. If the end of the memory WMEM is reached, the memory is used in a circular fashion, writing of the data continuing at the start of the memory WMEM.

Hereinafter the term "page" is used for an area of $2^n$ bytes allocated in the memory WMEM for containing a series of data units being processed by the processor. A page can be defined to contain one or more transfer bursts.

An example of operations that could be used for reading the data units and managing the page overflow in a conventional processor core is reproduced below. By way of example a set of instructions available on the ARM cores is used.

; code 1
LDR Rt, [Rptr, # offset]
LDR Rt2, [Rptr, # offset2]
LDR Rt3, [Rptr, # offset3]
. . .
(Operations on the registers Rt, Rt2, Rt3 . . . )
ADD Rptr, Rptr, Rinc
CMP Rmax, Rptr
BLMI [routine overflow management address]
(Continue Reading Data Units)

Rptr designates a register containing the pointer to the start of the data unit U to be read in the working memory WMEM. This register was previously loaded with the corresponding address.

The bytes contained in the current data unit U are then read by a succession of instructions denoted LDR (standing for "LoaD Register") in the form:

LD Rt, [Rptr, # offset]

Where Rt is the destination register and # offset is an immediate value that is added to the least significant bits, referred to as "offset", of the address contained in the register Rptr to identify the byte to be read or the word of a plurality of bytes to be read.

Once the current data unit has thus been transferred into the registers of the processor, it can be subjected to the operations that the program has reserved for it, not explained here.

To read the following data unit, the register Rptr is first of all incremented by the size of the data unit that has just been read, contained for example in a register Rinc:

ADD Rptr, Rptr, Rinc

The increment Rinc is the size, in bytes, of the data unit U. This increment may be fixed or be different for each data unit.

Such an updating of the pointer means that the data units are read sequentially. The data units could be read in an arbitrary order, in which case the pointer would be updated by other operations.

In any event, the new pointer contained in the register Rptr may still be within the limit of the page, however so close to the limit that the new data unit to be read is truncated and unusable (like the data unit U3 in FIG. 1). To manage this situation, it is possible to execute the following instructions at each incrementation of the pointer:

CMP Rmax, Rptr

The content of the register Rptr is compared with the content of a register Rmax. In practice this instruction subtracts the content of the register Rptr from the content of the register Rmax, and updates state variables or flags of the process in order to reflect the result of the subtraction. The register Rmax may contain the address of the end of the page, minus the size of the data unit to be read. Thus, if the difference is positive or zero, the following data unit is entirely contained in the page, and the reading can continue with the LDR operations previously described.

If the result is negative, which is identified by the activation of a flag denoted MI, the remaining content of the page cannot be used. It is possible to provide, after the CMP instruction, a conditional subprogram call instruction, on the basis of the flag MI, for example the instruction denoted BLMI. The subprogram is then designed to manage the overflow, for example by transferring the following data units into a new page of the working memory.

Checking of overflow of the page here involves the execution of a pair of instructions, comparison (CMP) and conditional call (BLMI), whenever a new data unit is read in the working memory, which may reduce the efficacy of the code, in particular when the data units are of small size.

The U.S. Pat. No. 6,542,990 describes an instruction for checking bounds BNDCHK that combines a comparison and the generation of an execution error according to the result of the comparison. The error is dealt with by the operating system in order to manage the cause of the overflow. Such an instruction could be executed in place of the pair of instructions CMP and BLMI after each addition ADD. The instruction BNDCHK is however designed to make comparisons in various configurations, resulting in a more complex processing unit.

In order further to increase the efficacy of the code, provision is made below to add a new generic instruction to the set of instructions of the processor, referred to as a combined instruction for addition and checking of bounds, denoted ADDCK. This instruction, an evolution of the simple addition ADD, may be designed to effect an addition while simultaneously checking that the result of the addition does not exceed a bound strictly less than capacity of the adder. ("Simultaneously" means that the check is made in the same instruction cycle as the addition, that is to say the checking is not done by a distinct instruction.) The bound may be implicit, that is to say associated with the instruction, or explicitly defined by a parameter of the instruction.

More precisely, the bound may be expressed in the form $2^n$, where n is an integer. If the capacity of the adder is expressed by $2^p$, where p is the width of the adder (typically 32 or 64), then n<p. The overflow of a bound $2^n$ can be detected by the activation of the carry bit of rank n of the adder, hereinafter denoted $c^n$. By using such a carry bit as a detection signal, a multitude of bounds including $2^n$ and all the multiples thereof up to $2^p$ are in fact defined. The "bound" then becomes the size of a segment, and the instruction ADDCK detects each transition from one segment to the following contiguous segment of the same size in an evolution space. This is particularly useful in applications envisaged, where it is in particular wished to monitor the evolution of a pointer in an address space straddling a plurality of contiguous pages of size $2^n$.

If the check is satisfied, that is to say if the bound is not overflowed by the result of the addition, the instruction ADDCK behaves as a simple addition ADD, and the program continues normally.

If the check fails, the instruction activates an overflow signal which, as previously indicated, can be taken from a carry bit, the rank n of which is defined implicitly or by a parameter of the instruction. The overflow signal can be used in several ways. It may activate a state variable or flag of the processor, said flag being deactivated when the overflow has been managed.

It should be noted that a conventional adder can be designed to activate the overflow flag when the result of the addition exceeds the capacity of the adder. This flag generally corresponds to the last-rank carry p of the adder. Since the adder is generally designed to process the numbers that are most managed by the processor, its capacity $2^p$ is much too great to be usable as a bound in the applications envisaged for the instruction ADDCK. The instruction ADDCK uses a bound strictly smaller than the capacity of the adder, and generally significantly smaller. For example, in the context of a processor with a 32-bit adder, and therefore one having a capacity of $2^{32}$, the bounds associated with the instruction ADDCK may for example range from $2^8$ to $2^{12}$.

Activation of an overflow flag by the instruction ADDCK may cause an error in execution that immediately hands over to the operating system for managing the overflow. The operating system then hands over to the program, which continues at the point where it was.

The overflow flag may generate an interruption of the processor, an interruption that can be managed in a similar manner to an error in execution.

These two alternatives (error and interruption) are relatively expensive in terms of instruction cycles, since they have recourse to the operating system. Alternatives that have recourse directly to an overflow-management procedure will be preferred.

Thus, instead of activating a flag, the overflow signal may cause a call on a subprogram at an address that is implicit or supplied as a parameter of the instruction ADDCK. The subprogram is then provided by the programmer to manage the overflow.

According to another alternative, the absence of activation of the overflow signal may cause an unconditional jump, in particular a jump forward by a number of instructions implicit or defined by a parameter of the instruction ADDCK. Activation of the overflow signal then has no effect, so that execution continues with the instructions immediately following the instruction ADDCK, and said instructions are then designed to manage the overflow. The jump may be by a single instruction, in which case a call on a subprogram immediately after the instruction ADDCK is provided.

An instruction ADDCK is generic and may have many uses. It was originally designed to increase the efficacy of the code in situations of the type in FIG. 1. In the example "code 1" above, the simple addition instruction:

ADD Rptr, Rptr, Rinc is then replaced by a combined instruction of addition and checking of bounds:

ADDCK Rptr, Rptr, Rinc, n

If the instruction ADDCK is designed to cause a jump, the address of the jump may be implicit (for example the address two instructions further on in the absence of overflow) in which case the instruction does not need an additional parameter. If the address of the jump is explicit, it can be supplied as a fifth parameter or as a "meta-parameter", that is to say the instruction is then designed to use a dedicated register containing the address of the jump.

The comparison instructions CMP and conditional subprogram call BLMI of the example "code 1" are then omitted, and this for each iteration of reading of a data unit. The following operations are obtained by way of example:
; code 2
LDR Rt, [Rptr, # offset]
LDR Rt2, [Rptr, # offset2]
LDR Rt3, [Rptr, # offset3]
. . .
(Operations on the registers Rt, Rt2, Rt3 . . . )
ADDK Rptr, Rptr, Rinc, n (Continue Reading Data Units)

Figure 2:
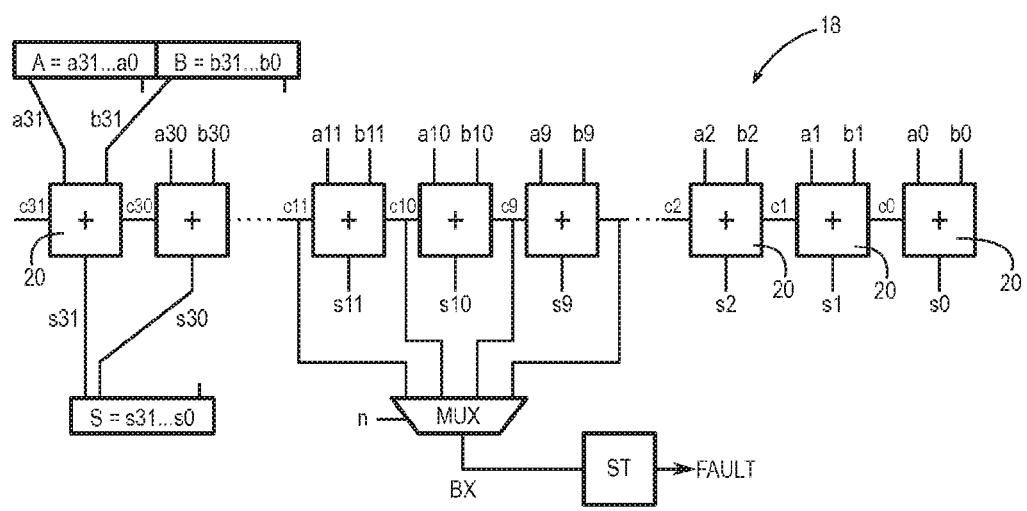
FIG. 2 shows schematically an adder included in a processing unit of a processor core, supplemented according to a first embodiment in order to offer a combined instruction of addition and checking of bounds.

FIG. 2 illustrates schematically a first embodiment of a checking circuit constructed around the adder 18 present in the arithmetic unit of a simple processor. The instruction to be executed is denoted ADDCK S, A, B, n where S designates the register receiving the result of the addition, A and B designate the registers containing the operands, and n is the logarithm to base 2 of the size of the current page. In other words, the size of the page is equal to $2^n$ bytes. The bits contained in the registers S, A and B are designated $s_i$, $a_j$, $b_k$, where i, j and k are integers designating the weights of the bits.

By way of example, the adder 18 is a 32-bit adder comprising 32 elementary addition cells 20. To simplify the disclosure, it is assumed that the adder is of the ripple-carry type. Each cell 20, except the first, is a complete adder having two inputs for the operands $a_i$, $b_i$, a carry input $c_{i-1}$, a result output $S_i$, and a carry output $c_i$ connected to the carry input of the following cell. The first cell differs in that it has no carry input.

As previously indicated, the overflow signal BX can be taken from the carry bit $c_n$.

If a fixed page size is chosen for the system, for example of $2^{10}=1024$ bytes, the parameter n of the instruction ADDCK can be omitted and the overflow signal BX is directly taken from the carry bit $c_{10}$.

It should be noted that the rank n of the carry bit serving to thus provide the overflow signal is generally small compared with the width of the adder, and in any event strictly less than the width of the adder.

FIG. 2 illustrates in more detail an example for using a parameter n variable from 8 to 11, and therefore choosing pages of 256, 512, 1024 or 2048 bytes. The carry bit $c_8$ to $c_{11}$ to be used as an overflow signal BX is selected by a multiplexer MUX controlled by the parameter n. As already mentioned, the signal BX can activate a state variable ST of the processor and, for example, trigger an execution error serving to initiate an overflow management procedure.

With this structure, when the pointer identifies an incomplete data unit at the end of the page, such as the unit U3 in FIG. 1, the overflow is not yet indicated since the pointer is within the limits of the page. The overflow will be indicated at the following incrementation, whereas the incomplete data unit (U3) will have been read by the processor. In this case, the overflow management procedure could be designed to cancel out the effects of the reading of the last data unit. To avoid this complication, it is possible to proceed in the manner disclosed below.

Figures 3A, 3B:
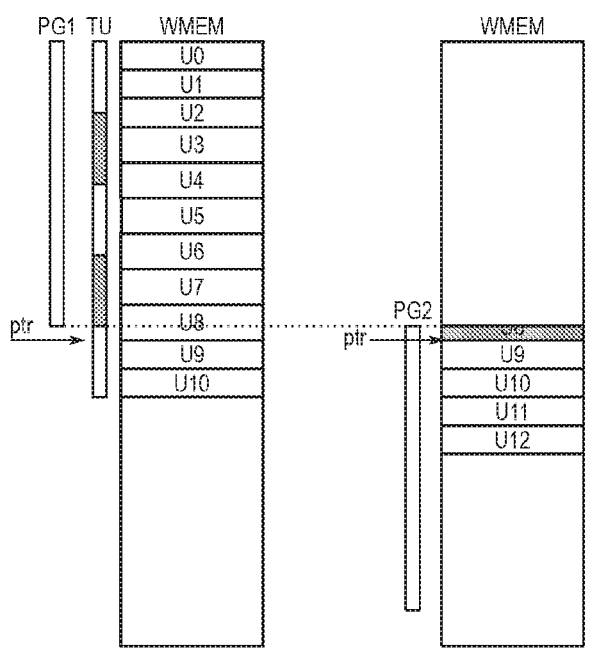
FIGS. 3A and 3B illustrate a transition between two reading phases of a memory caused by a combined addition and checking instruction.

FIGS. 3A and 3B illustrate a transition between the reading of a page and the preparation of the following page following the execution of an instruction ADDCK.

In FIG. 3A a first page PG1 is allocated in the memory WMEM, for example starting from the beginning of the memory. The data units are transferred into the memory in bursts or transfer units TU the size of which is chosen so as to be a submultiple of the size of a page, in order to completely contain at least one data unit and to offer sufficient transfer efficacy from the producing entity (for example a dynamic memory). By way of example, the size of the page may be 1024 bytes and the size of the transfer units may be 256 bytes.

In FIG. 3A, a sufficient number of transfer units TU (for example 4) to form the page PG1, and a transfer unit in addition, have been written in the memory WMEM. All the transfer units written (five) contain the data units U0 to U10.

The unit U8 overflows at the end of the page PG1, but it is entirely contained in the memory WMEM.

The instruction ADDCK is used to implement a pointer ptr at each reading of a data unit U. When the pointer ptr arrives at the location of the unit U8, the instruction ADDCK does not yet indicate overflow since the pointer is within the limits of the page. Reading of the unit U8 starts in the page and ends outside the page. The instruction ADDCK is next executed in order to increment the pointer ptr, which then identifies the location containing the unit U9. The pointer is then outside the page and overflow is indicated.

In FIG. 3B, the overflow management procedure allocates a new page PG2 in the memory WMEM following the page PG1, and initiates writing of the following data in the new page. The transfer starts as from the point where the data unit U8 had been truncated in the first page. However, as the unit U8 has been correctly taken into account by the processor, the pointer ptr is updated in order to start on the data unit U9.

Up until now it has been assumed that the data units U could have a variable size, making it difficult to predict the overflow of the page and involving a management of data units that may be incomplete (U8). If all the data units have the same size in memory of $2^m$ bytes (for example 64), then a page of $2^n$ bytes (for example 1024) contains exactly $2^{n-m}$ complete data units (for example 16).

In this case, when the pointer overflows from the page, it identifies the location immediately following the page. The result is that the last data unit read was contained completely in the page and that a procedure of the type in FIGS. 3A and 3B is unnecessary.

In some processors, there exist instructions that combine an addition with another operation that does not need the adder. For example, the set of instructions ARM comprises reading instructions (LDR) and writing instructions (STR) with pre- or post-incrementation of the register storing the reading or writing address. With pre-incrementation, the address register is first of all incremented and then serves to access the memory. With post-incrementation, the address register is first used for accessing the memory and then incremented. These instructions may be duplicated by versions offering the checking of bounds in association with the addition for implementing the address register.

Up until now examples of data transfer where the processor was a consumer of data units have been described. The processor could also be a producer of data units to be transferred into the system memory, in which case, in the code examples supplied, the instructions for reading in the working memory (LDR) are replaced by instructions for writing in the working memory (STR). The instruction ADDCK may be used in a similar manner. The overflow management procedure can then be designed to empty the content of the current page and allocate a blank page for continuing the writing.

Many variants and modifications of the embodiments described here will be clear to a person skilled in the art. For example, although a pointer has been described that is incremented for running through increasing addresses, a pointer that is decremented for running through decreasing addresses can also be envisaged. The decrementation operation is none other than an addition of a negative increment to the value of the pointer, which uses an adder structure designed to work on signed binary numbers. In the case of a subtraction, the overflow signal BX in the structure in FIG. 2 is supplied by the complement of the carry bit.

The invention claimed is:

1. A data transfer method implemented by a processor core wherein the processor core's set of instructions comprises a combined addition and bound-checking instruction defining an integer n implicitly, or explicitly as a parameter of the instruction, and the processor core comprises an adder having a width p strictly greater than n bits; and a processing circuit designed to respond to the combined instruction by activating an overflow signal when the adder generates a carry of rank n during the addition of operands of width p, wherein the data transfer method comprises the following steps:
    allocating a memory, the size of which is a power of 2 and the address of which is a multiple of the size, in a working memory of the processor core, to contain a series of data units (U) in respective consecutive locations;
    identifying the start of a current location of a data unit by a pointer contained in a working register (Rptr) of the processor core;
    using the current location;
    executing a combined addition and bound-checking instruction (ADDCK) for incrementing the pointer, the bound of the combined instruction being based on the size of the page; and
    executing an overflow management procedure in response to the activation of the overflow signal.

2. The method according to claim 1, wherein the overflow management procedure is programmed to allocate a new page in the working memory and to update the pointer in order to identify a starting location in the new page.

3. The method according to claim 1, wherein the step of using the current location in the memory page comprises the reading of the data unit contained in the current location in order to transfer it into registers of the processor, the method further comprising the following steps:
    reserving a memory area following the page, of sufficient size to contain a complete data unit; and
    transferring into the memory page data units supplied by a producing entity, the integer number of data units being sufficient to fill the page and to overflow into the reserved memory area, the data units having an arbitrary size able to mean that the page does not contain an integer number of data units, the result of this being that the activation of the overflow signal may occur when data has been read beyond the page.

4. The method according to claim 1, wherein the processing circuit is designed to trigger an execution error when the overflow signal is activated, the result of which is that the procedure triggered for dealing with the error comprises an overflow management procedure.

5. The method according to claim 1, wherein the processing circuit is designed to cause a systematic forward jump by one or more instructions when the overflow signal is inactive, and a normal continuation when the overflow signal is activated, the result of which is that the instruction or instructions immediately following the combined instruction can be designed to manage the overflow.

6. The method according to claim 1, wherein the processing circuit is designed to cause a call on a subprogram when the overflow signal is activated, and a normal continuation when the overflow signal is inactive, the result of which is that the subprogram is designed to manage the overflow.

7. The method according to claim 1, wherein the processing circuit further comprises in a processing circuit set of instructions reading instructions with address pre- and post-incrementation, including for the address incrementation an addition combined with a checking of bounds.

* * * * *